July 27, 1943.                    W. H. HARRISON                    2,325,131
                        CONTINUOUS MOTION OPTICAL APPARATUS
                              Filed June 21, 1940              2 Sheets-Sheet 1
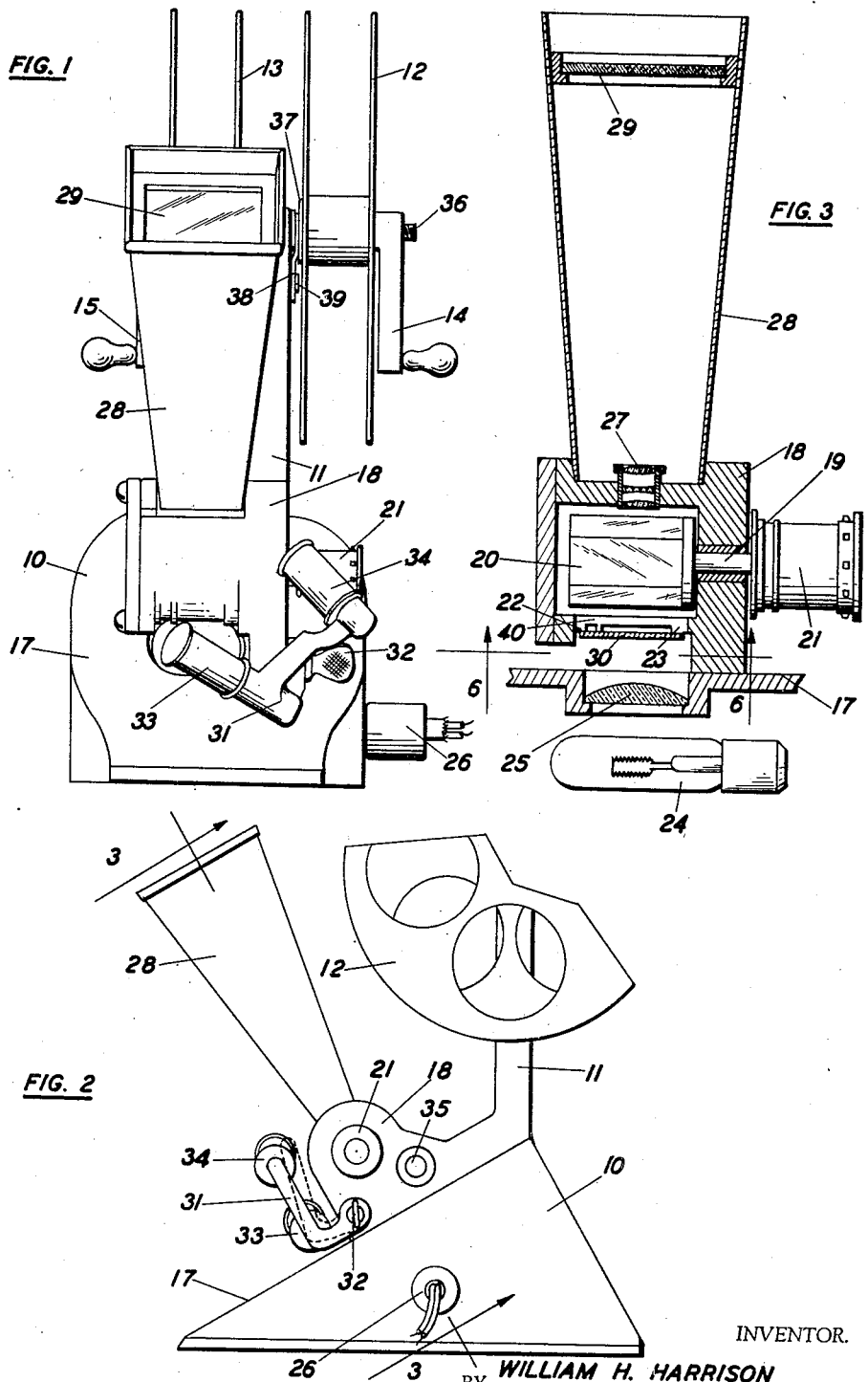
INVENTOR.
WILLIAM H. HARRISON
BY Robert W. Fulwider
                    ATTORNEY.

July 27, 1943.   W. H. HARRISON   2,325,131
CONTINUOUS MOTION OPTICAL APPARATUS
Filed June 21, 1940   2 Sheets-Sheet 2
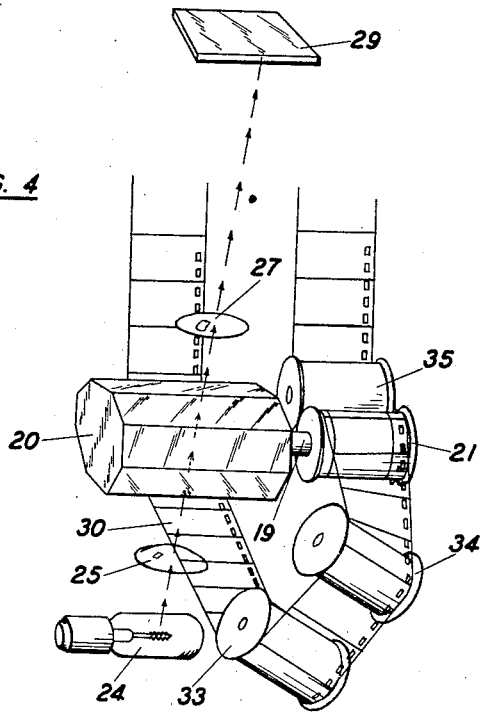
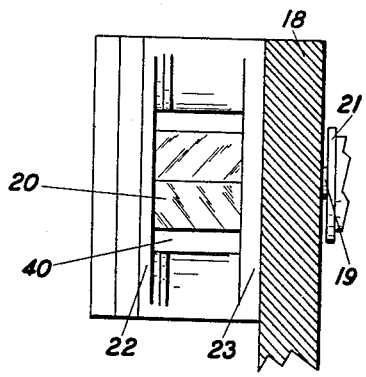
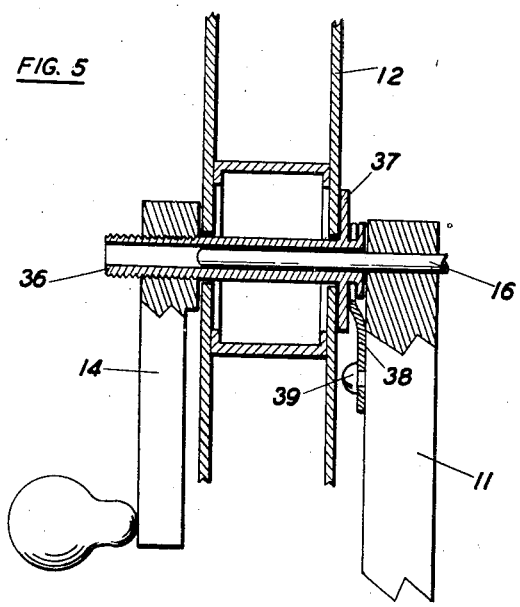
INVENTOR.
WILLIAM H. HARRISON
BY
ATTORNEY.

Patented July 27, 1943

2,325,131

UNITED STATES PATENT OFFICE 2,325,131

CONTINUOUS MOTION OPTICAL APPARATUS

William H. Harrison, Los Angeles, Calif.

Application June 21, 1940, Serial No. 341,712

10 Claims. (Cl. 88—16.8)

My invention relates generally to continuous motion optical apparatus, and more particularly to an adaptation of such apparatus to the field of continuous-motion projection of motion pictures, although as will become apparent, my invention has a wide range of uses, including continuous-motion photographing.

It has long been the goal of those skilled in the photographic art to produce a satisfactory continuous-motion system of photography and projection, and many types of apparatus have been offered to the trade which purpose to accomplish this highly desirable result. One of the fundamental problems of all continuous-motion mechanisms is that of simplicity of construction and accuracy of reproduction. In my copending application, Serial No. 255,079, filed February 7, 1939, and entitled "Optical system for cinematography," I have disclosed a relatively simple continuous-motion projection apparatus which embodies certain basic features which render it both economical to manufacture and operate, and also capable of producing highly satisfactory motion pictures.

It is a major object of this invention to further simplify and refine the apparatus disclosed in my said copending application, and particularly to provide a continuous-motion apparatus which is more economical to produce and which eliminates the possibility of error which may creep into an apparatus employing gear connections. That I have accomplished these major features, as well as various other objects and advantages, will become apparent from the following description of a preferred form of apparatus embodying the principles of my invention, and from an inspection of the accompanying drawings, in which:

Fig. 1 is a front elevation of a viewing apparatus, embodying my invention,

Fig. 2 is a side elevation of said apparatus showing one of the film spools, partially broken away, Fig. 3 is a substantially vertical section, taken along the line 3—3 in Fig. 2, Fig. 4 is a schematic diagram of the rotating block and the film-advancing mechanism, Fig. 5 is a rear view of an enlarged vertical section of the winding apparatus, and Fig. 6 is a bottom plan view taken along the line 6—6 in Fig. 3.

Referring now to the drawings, and particularly to Figs. 1 and 2 thereof, which illustrate a preferred embodiment of my invention, the numeral 10 indicates a hollow base which is preferably triangular in vertical cross-section and supports a substantially vertical arm 11, upon the upper end of which are mounted two film spools 12 and 13 which may be of conventional design. The spools 12 and 13 are provided with cranks 14 and 15, respectively, and are mounted on a common shaft 16, as will be discussed more in detail hereinafter. Mounted upon the forward angular wall 17 of housing 10 is an upstanding bracket 18, formed as a partial housing and having a shaft 19 journalled in the vertical leg thereof. A transparent refractive member such as the block 20, which in the preferred form shown is octagonal in cross-section, is fixed to the inner end of shaft 19, and a film sprocket 21 is affixed to the outer end of said shaft. The type of sprocket illustrated in Fig. 3 is conventional for 16 mm. sound track film, but it will be understood that other appropriate kinds of sprockets may be employed, depending upon the particular type of film which it is desired to use in the apparatus. The refractive member 20 is preferably made of glass or some suitable transparent plastic, such as "Lumarith" or the like, and is preferably constructed with its opposite faces parallel and otherwise in accordance with the specifications disclosed in my aforesaid pending application.

As seen best in Figs. 1 and 3, the lower portion of the bracket 18 forms a film gate guide comprising rails 22 and 23, which define an aperture 40 and are adapted to have a motion picture film led thereacross. The film gate is of course aligned with the rotating block 20 so that light from a lamp 24, passing up through a lens 25 disposed in an aperture in housing wall 17, will pass through said film when positioned on guides 22 and 23, and thence upwardly through the rotating block 20. Lamp 24, as mentioned, is preferably disposed within the housing 10, and is provided with an electrical connection 26. A projection lens 27 is disposed in an aperture in the upper portion of the bracket 18 and is optically-aligned with block 20 and the light source 24. An elongated hood 28 is also mounted in the upper portion of bracket 18, and surrounds the projection lens 27, the upper portion of the hood being provided with a diffusing screen, such as a ground glass 29, disposed slightly inside of the mouth of the hood 28. It will thus be apparent that light rays emanating from the source 24 will pass through condenser lens 25, film 30, block 20, and lens 27 to project the image of said film onto the screen 29.

Referring now to Figs. 1 and 2 it will be seen that a bracket 31 is pivotally mounted on the housing 10 by suitable means such as a pin 32 mounted in the lower forward portion of bracket 18. I prefer to make the bracket 31 generally L-shaped, and provide it with a pair of film rollers 33 and 34 which are angularly disposed with respect to said bracket 31, film guides 22 and 23, and sprocket 21, so as to form a loop in the film 30 which reverses its direction of travel with respect to the film gate and displaces it sufficiently after it passes across guides 22 and 23 to enable it to be fed on to and across sprocket 21. An idling roller 35 is rotatably mounted adjacent the sprocket 21, whereby the film 30 may be passed over the sprocket 21 and under the roller 35 to be securely held thereby and prevent slipping of the film on the sprocket. It will thus be seen that movement of the film 30 across the sprocket 21 will cause rotation of the sprocket, and consequently of the shaft 19 and the block 20, thus providing the highly desirable result of having the refractive member and driving means juxtaposed, and also of having the film drive the refractive member without the use of a gear train. By thus eliminating the necessity of a gear connection between sprocket 21 and rotating block 20, I eliminate all possible errors due to backlash in the gears, or inaccuracies in their formation or installation, and thereby insure perfect coordination between the film and the block.

As previously mentioned, I provide a shaft 16 in the upper portion of the standard 11 which extends outwardly from each side thereof to support the reels 12 and 13, one of which operates as the supply reel and the other of which operates as a take-up reel. I have found that it is very advisable to provide tension means to keep the film loop between the film gate and the sprocket relatively taut so as to insure satisfactory operation at all times. As seen best in Fig. 5, the reels in the form illustrated are mounted on a collar 36 which is provided with an inner flange 37, against which a spring 38 bears to create a frictional drag. The spring 38 may be fastened to the standard 11 by any suitable means, such as a screw 39. The collar 36 extends outwardly beyond the film reel and is provided with an external threaded portion upon which the crank is screwed up tight against the reel. It will be understood, of course, that in Fig. 5 I have illustrated only one of the reels and that a similar reel, such as indicated by the numeral 13 in Fig. 1 is mounted on the rightward extension of the shaft 16 in Fig. 5. It is also to be understood that other tensioning means may be employed.

In the operation of my device, a roll of motion picture film carrying the usual series of images is mounted on reel 13 and is threaded down across the film gate comprising guides 22 and 23 on the lower portion of the housing bracket 18, thence around the idle rollers 33 and 34, around sprocket 21 and its cooperating idle roller 35, and thence up to the take-up reel 12. By having the idle roller bracket 31 adjustable, it is possible to easily "frame" the picture on the screen 29, since by merely rotating the bracket 31 about its pivot point 32, as indicated by the dotted lines in Fig. 2, the relative position of the film with respect to the film gate and the sprocket can be varied, to insure a complete single "frame" of the film being projected on to the screen 29 in proper position. By merely turning the crank 14 on the take-up or rewind reel 12, the film is caused to move across the optical path defined by the above described optical system, and by reason of the coordination between the film movement and the rotation of the transparent block 20, together with the appropriate lenses, a moving picture is produced on the screen 29. As fully described in my copending application, Serial No. 255,079, the rotation of the block 20 maintains one frame image on the screen 29 until such time as the next frame image is substantially in register therewith, and by reason of the construction of the block and its correlation with its related parts, the illuminations are such that the second or incoming image is visible before the outgoing image completely disappears. Consequently, we secure consecutive images on the screen 29 without the use of intermittent pulldown mechanisms and shutters with the full effect of motion. It will be apparent, of course, that by manually controlling the two reels, the film may be passed in either direction across the optical path, and may be stopped at any point to enable a person to cut and splice the film as may be required in editing the same. Or, if the apparatus is used strictly as a projector, it will be seen that by continuous turning of the crank 14, a complete reel of motion pictures is projected upon the screen 29 and may be viewed by one or more people with the same effect as though the pictures were projected upon a larger screen. In this connection, it is of course possible to drive the take-up reel by a motor or similar means, and by employing a stronger light source and more powerful lenses to throw the image on to a large screen remote from the projection apparatus itself, so that more people can view the pictures.

Thus, it will be seen that by providing the angularly-positioned rollers 33 and 34 and mounting the sprocket 21 and rotating block 20 on a common shaft, I provide a simple and accurate continuous-motion projector which is substantially devoid of errors and which can be applied to many uses. It is to be understood, of course, that while the form of my invention shown herein is fully capable of attaining the objects and providing the advantages hereinbefore mentioned, it is merely illustrative of the broad scope of my invention as defined in the appended claims.

I claim as my invention:

1. A continuous-motion viewing device which includes: a base; an optical system comprising a light source, lens means, a rotative transparent refractive polygonal block and a screen, optically aligned with one another, said screen being supported by a tubular hood mounted on said base above said refractive block; a film sprocket mounted on the same shaft as said block and in juxtaposition therewith; a film spool mounted on said base; a film gate for guiding a strip of film from said spool past said refractive block and through said optical path; an adjustable bracket mounted on said base carrying roller means adapted to guide said film from said film gate to said sprocket and adapted to form a loop in said film during its said travel; means for holding said film in engagement with said sprocket; and a take-up spool mounted on said base and adapted to receive said film passing over said sprocket.

2. A continuous-motion viewing device as defined in claim 1 in which means are provided for maintaining the film taut between said gate and said sprocket.

3. A continuous-motion viewing device as defined in claim 1 in which said feed spool is mounted on a sleeve which is rotatable on a shaft, said sleeve being provided with a flanged collar which is frictionally engaged by a spring member.

4. A continuous-motion viewing device which includes: a base; an optical system comprising a light source, lens means, a rotative transparent refractive polygonal block and a screen, optically aligned with one another; a film sprocket mounted on the same shaft as said block and in juxtaposition therewith; a film spool mounted on said base; a film gate for guiding a strip of film from said spool past said refractive block and through said optical path; an adjustable bracket mounted on said base carrying roller means adapted to guide said film from said film gate to said sprocket and adapted to form a loop in said film during its said travel; means for holding said film in engagement with said sprocket; and a take-up spool mounted on said base and adapted to receive said film passing over said sprocket.

5. A continuous-motion viewing device which includes: a base; an optical system comprising a light source, lens means, and a rotative transparent refractive polygonal block optically aligned with one another; a film sprocket mounted on the same shaft as said block and in juxtaposition therewith; a film spool mounted on said base; a film gate for guiding a strip of film from said spool past said refractive block and through said optical path; an adjustable bracket mounted on said base carrying roller means adapted to guide said film from said film gate to said sprocket and adapted to form a loop in said film during its said travel; means for holding said film in engagement with said sprocket; and a take-up spool mounted on said base and adapted to receive said film passing over said sprocket.

6. A continuous-motion viewing device which includes: a base; an optical system comprising a light source, lens means, and a rotative transparent refractive polygonal block optically aligned with one another; a film sprocket mounted on the same shaft as said block and in juxtaposition therewith; a film spool; a film gate for guiding a strip of film from said spool past said refractive block and through said optical path; a bracket mounted on said base carrying roller means adapted to guide said film and displace it laterally from said film gate to said sprocket and adapted to form a loop in said film during its said travel; means for holding said film in engagement with said sprocket; and a take-up spool adapted to receive said film passing over said sprocket.

7. A continuous-motion viewing device as defined in claim 6 in which said feed spool is mounted on a sleeve which is rotatable on a shaft, said sleeve being provided with a flanged collar which is frictionally engaged by a spring member.

8. A continuous-motion viewing device which includes: a projection lens; a film gate; a transparent refractive member rotatably mounted between said lens and said gate and in physical alignment therewith; a light source optically aligned with said gate and lens; a film sprocket direct-coupled to said refractive member in juxtaposition therewith and adapted to rotate the same; and means forming a loop in said film, reversing its direction of travel and displacing it laterally after it passes said gate whereby it can be led to and across said sprocket and held in engagement therewith.

9. A continuous-motion viewing device which includes: a projection lens; a film gate; a transparent refractive member rotatably mounted between said lens and said gate and in physical alignment therewith and forming an optical path therewith; a light source optically aligned with said gate and lens; a film sprocket direct coupled to said refractive member and adapted to rotate the same; and a pair of rollers angularly disposed with respect to each other and adapted to form a loop in said film and reverse its direction of travel after it passes said gate whereby it can be led to and across said sprocket and held in engagement therewith.

10. A continuous-motion viewing device which includes: a projection lens; a film gate; a transparent refractive member rotatably mounted between said lens and said gate and in physical alignment therewith; a light source optically aligned with said gate and lens; a film sprocket coaxial with said refractive member and adapted to rotate the same; and adjustable means forming a loop in said film reversing its direction of travel and displacing it laterally after it passes said gate whereby it can be led to and across said sprocket and held in engagement therewith.

WILLIAM H. HARRISON.